United States Patent [19]

Karp

[11] Patent Number: 4,866,769

[45] Date of Patent: Sep. 12, 1989

[54] HARDWARE ASSIST FOR PROTECTING PC SOFTWARE

[75] Inventor: Alan H. Karp, Palo Alto, Calif.

[73] Assignee: IBM Corporation, Armonk, N.Y.

[21] Appl. No.: 82,015

[22] Filed: Aug. 5, 1987

[51] Int. Cl.[4] .............................................. H04L 9/00
[52] U.S. Cl. .......................................... 380/4; 360/60
[58] Field of Search ....................................... 380/2–5, 380/22, 25, 59; 364/200, 900; 360/60

[56] References Cited

U.S. PATENT DOCUMENTS

| | | | |
|---|---|---|---|
| 4,168,396 | 9/1979 | Best | 364/200 X |
| 4,168,396 | 9/1979 | Best | 364/200 X |
| 4,433,207 | 2/1984 | Best | 380/4 |
| 4,453,074 | 5/1984 | Weinstein | 235/320 |
| 4,458,315 | 7/1984 | Uchenick | 364/200 |
| 4,471,163 | 9/1984 | Donald et al. | 364/200 X |
| 4,513,174 | 4/1985 | Herman | 364/200 X |
| 4,528,588 | 7/1985 | Löfberg | 380/5 X |
| 4,577,289 | 3/1986 | Comerford et al. | 364/900 |
| 4,584,641 | 4/1986 | Guglielmino | 364/200 |
| 4,590,470 | 5/1986 | Koenig | 640/825.31 |
| 4,593,353 | 6/1986 | Pickholtz | 364/200 |
| 4,595,950 | 6/1986 | Löfberg | 380/5 |
| 4,634,807 | 1/1987 | Chorley et al. | 380/4 |
| 4,644,493 | 2/1987 | Chandra et al. | 364/900 |
| 4,649,233 | 3/1987 | Bass et al. | 380/21 |
| 4,652,990 | 3/1987 | Pailen et al. | 364/200 |
| 4,658,093 | 4/1987 | Hellman | 380/25 |
| 4,670,857 | 6/1987 | Rackman | 380/4 |
| 4,683,553 | 7/1988 | Mollier | 380/4 |
| 4,683,968 | 8/1987 | Appelbaum et al. | 380/4 |
| 4,740,890 | 4/1988 | William | 364/200 |
| 4,747,139 | 5/1988 | Taaffe | 380/4 X |
| 4,757,468 | 7/1988 | Domenik et al. | 364/900 |
| 4,757,534 | 7/1988 | Matyas et al. | 380/25 |
| 4,796,220 | 1/1989 | Wolfe | 364/900 |

OTHER PUBLICATIONS

Voelcker et al., "How Disks are Padlocked"; *IEEE Spectrum*, (vol. 23, No. 6; 6/86; pp. 32–40).

Diffie et al., "New Directions in Cryptography"; Invited Paper, IEEE Transactions on Information Theory, vol. IT-22, No. 6, Nov. 1976.

Merkle et al., "Hiding Information and Receipts in Trap Door Knapsacks", Department of Electrical Engineering, Stanford University, Stanford, California 94305.

Rivest et al., "A Method for Obtaining Digital Signatures and Public-Key Cryptosystems", Technical Memo LCS/TM82, Massachusetts Institute of Technology, Laboratory for Computer Sciences, Cambridge, Mass. 02139.

Lamport, "Password Authentication with Insecure Communication", SRI International, 333 Ravenswood Ave., Menlo Park, California 94025.

*Primary Examiner*—Stephen C. Buczinski
*Assistant Examiner*—Bernarr Earl Gregory
*Attorney, Agent, or Firm*—Baker, Maxham, Jester & Meador

[57] ABSTRACT

The copy protection of personal computer (PC) software distributed on diskettes is assisted by providing a unique identification (ID) stored in read only memory (ROM) of a personal computer in which software on a diskette is to be used. This ID is accessible to the user of the computer. A vendor who wishes to protect his diskette-distributed software from illegal copying or use provides a source ID on the diskette. The personal computer ID is used with the source ID on the distributed diskette to produce an encoded check word, using any available encryption modality. The check word is generated and written onto the distributed diskette during installation and copied onto all backup versions made by the user's personal computer. Prior to each use of the program, the software on the diskette uses the personal computer and the source IDs and check word to verify that the software is being used on the same personal computer on which it was installed.

9 Claims, 4 Drawing Sheets

HARDWARE ASSIST FOR PROTECTING PC SOFTWARE

BACKGROUND OF THE INVENTION

This invention relates to copy protection of software on publicly-distributed diskettes through the use of an encryption technique which authenticates a uniquely-identified computing system as the one on which the software has originally been installed.

Computing and the use of computers is no longer limited exclusively to large businesses and scientific or technical organizations. Computers are now widely employed by individuals to conduct the everyday transactions necessary to the lives of those individuals. A large personal computing industry has sprung up as a result.

The personal computing industry includes not only the production and marketing of hardware (personal computers), but also development and commercial distribution of software.

The software sector of the personal computing industry is marked by fierce competition and predatory practices. The possible consequences of copyright, trademark, and patent infringement have as little effect in dissuading the illegal reproduction, distribution and use of retail software as do commonly-acknowledged ideals of personal property and fair play. Elaborate schemes have been hatched to prevent illegal copying of software from diskettes. These efforts are directed not only at software pirates who operate as illegal, secondary suppliers of software, but also at individuals who permit casual, but illegal copying of software which they legally own.

The efforts to prevent illegal copying of personal computing software distributed in the form of diskettes are lumped under the term "copy protection." In view of the substantial and continuing black market in illegal personal computing software, additional effective schemes for copy protection are desperately needed. Further, it would be desirable also to provide a deterrent to use which is illegal, but which may not include copying.

The term copy protection includes a host of techniques aimed at the detection and prevention of illegal copying. These are known and widely reported One technique involves insertion into software of artifacts whose locations are randomly determined when the software is initially placed on a diskette, and which can only be reproduced under the original copying conditions. When illegal copying is attempted, the artifacts are obliterated; their absence is detected by a process in the software which reacts by altering the software program Another approach to copy protection involves the use of encryption to encrypt all or part of a mass-marketed software distributed on diskette form. In this regard, because of the prohibitive cost of encrypting and decrypting all of the software which is to be protected, encryption of an entire program is usually limited to certain main frame systems.

Encryption is well understood in both its theoretical and practical aspects. Reference is given to: Massachusetts Institute of Technology document MIT/LCS/TM-82 entitled "A Method for Obtaining Digital Signatures in Public-Key Cryptosystems," authored by Rivest et al.; a publication authored by Merkle et al. and distributed by the Department of Electrical Engineering, Stanford University, entitled "Hiding Information and Receipts in Trap Door Knapsacks"; "New Directions in Cryptography" from *IEEE TRANSACTIONS ON INFORMATION THEORY*, Volume IT-22, No. 6 November 1976, by Diffie et al.; and the article entitled "Password Authentication With Insecure Communication," *COMMUNICATIONS OF THE ACM*, Volume 24, No. 11, November 1981 by Lamport. It is understood that many modifications of encryption are available, including public-key encryption.

Utilization of encryption to protect data carried in a portable data storage medium is found in U.S. Pat. No. 4,453,074 of Weinstein. The Weinstein patent discloses use of a password referenced to the personal characteristics of the possessor of a "credit card." This patent concerns the encryption of the concatenation of the password with a non-secret reference text, with the encryption effected by the secret one of a key pair. The result of the encryption is placed on the credit card so that, when the credit card is presented to a terminal for conducting a transaction, the transaction is authorized by decryption of the concatenated words in the terminal and comparison of the decryption with the joinder of the password entered by the user and the non-secret reference text which is available to the terminal. In the Weinstein example, one appreciates the use of encryption simply to gain entree to a system through a portable means (a credit card). In Weinstein the only use of encryption is to disguise the key unlocking the gate of access to the system; once access is gained, a transaction is conducted through the exchange of unencrypted data.

Other examples of cryptographically controlled access to computing resources are provided in U.S. Pat. No. 4,649,233 of Bass et al. and U.S. Pat. No. 4,590,470 of Koenig. However, neither of these examples use an encrypted key to limit the use of diskette-distributed software to authorized hardware which is under the control of a software user, rather than the software distributor.

SUMMARY OF THE INVENTION

The invention is based on the critical observation that a software vendor or distributor can limit access to diskette-borne software out of his control by use of a pass to the software which is created when the software is initially installed, then placed in the software after creation, and, thereafter, checked each time the software is initialized for execution or copying. The inventor has realized that such checking is effectively and efficiently implemented by the assignment of a randomly-determined CPU identification (CPUID) to each CPU capable of executing the software. When the software is distributed in diskette form, the source of the software (the vendor, for example) places a unique source identification (SID) on each diskette, which is combined with a CPUID by an encryption modality also on the diskette. The encryption takes place when the diskette is first installed in the personal computer wherein the identified CPU is located. The product of the encryption is a check number placed on the diskette and used to qualify a check number generated by the encryption modality each time the software is executed or copied. If execution or copying is attempted through a CPU different from the one on which the software was originally installed, the check number placed on the diskette at installation will, in all likelihood, not match that produced by the encryption modality in response to the SID on the diskette and the identification of the other CPU. If the check number generated does not match the stored one, an evasion process is invoked which prevents user copying of the software on the unauthorized machine.

The invention is expressed as a method of controlling the use and replication of diskette software contents and the like on unauthorized diskette-driven computing systems. The method includes placing a first identification (ID) code in a preselected computing system and then associating a second identification (ID) code with a source of programming software for the computing system. Next, the second ID code is placed on a diskette having a program obtained from the programming source. A first check number is derived through encryption of one of the identification codes by the other of the identification codes, and the check number is placed on the diskette. Thereafter, upon access of the diskette by any computing system, a second check number is derived through the encryption based upon the second identification code on the diskette and an identification code in the accessing computing system and the second check number is compared with the first check number. If the two check numbers are identical, execution or copying of the software proceeds. This method contemplates the provision of execution evasion and copy protect features embedded in the software on the diskette and bypassing the features in the event that the two check numbers match.

The invention is expressed also as a system for authorizing the use or replication of diskette software contents on selected computing systems, the system including a diskette containing a software program, a source identification (SID) code on the diskette associated with and identifying the source of the software, and a computing system for receiving the diskette and including at least one CPU having an embedded CPU identification (CPUID) code associated with and identifying that CPU. A programming modality is provided in the software which is executable on the CPU and which generates a check number through encryption of one of the ID codes by the other of the ID codes and uses the check number to prevent the execution or copying of the software on a CPU other than the identified one.

The system affords site licensing of the software on the diskette by including a check storage area on the diskette for receiving a plurality of check numbers, each generated by the programming modality in response to the SID and a CPUID from a respective one of a plurality of authorized CPUs operating in the computer system. The site licensing embodiment also includes provision in the programming modality for using the check numbers in the check storage area to prevent execution or copying of the software by an unauthorized CPU.

The primary object of the summarized invention is therefore to provide efficient, yet effective protection of mass-distributed, diskette-carried software from use or copying by unauthorized personal computing systems.

Another objective is to utilize encryption to effect controlled access to software on a diskette by a single authorized computer.

These and other objects and attendant advantages of this invention will become more apparent when the following description of the preferred embodiments is read in connection with the below-described drawings, in which:

DESCRIPTION OF THE PREFERRED EMBODIMENTS

Figures 1, 3, 6:
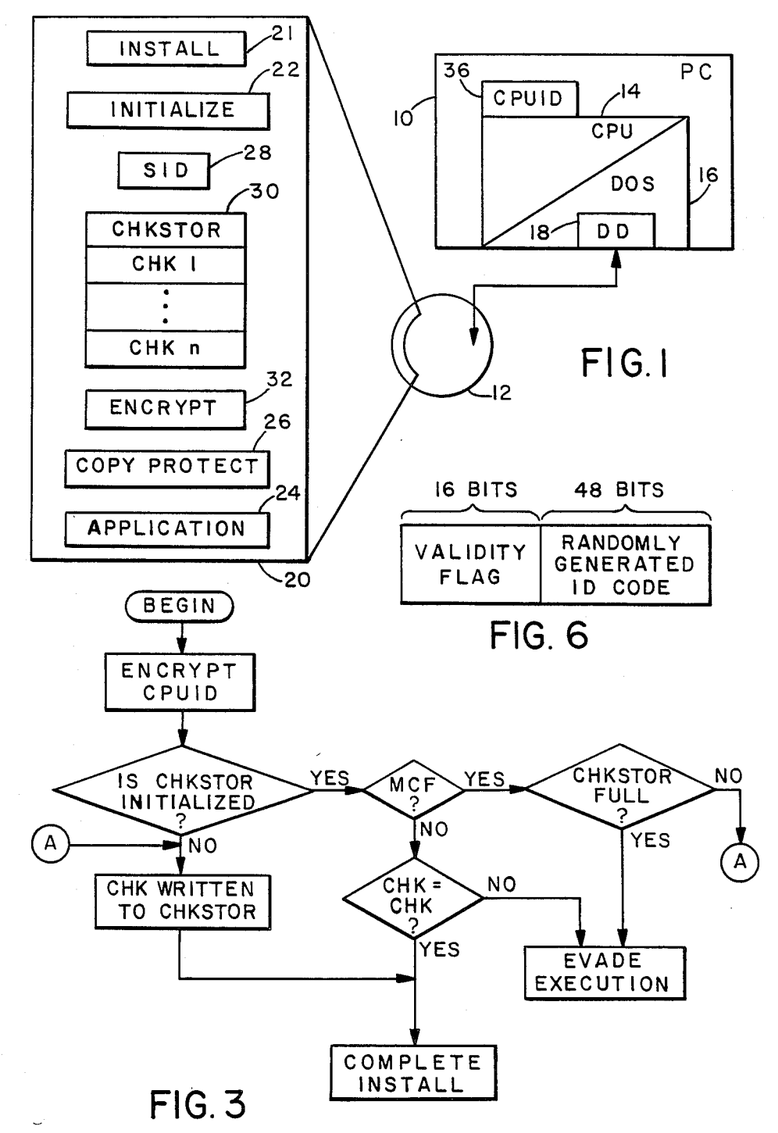
FIG. 1 illustrates the components of the invention in their application context.
FIG. 3 is a flow diagram illustrating the practice of the method of the invention during the initial installation routine contained in the software of the diskette of FIGS. 1 and 2.
FIG. 6 is a representation of a CPUID.

Giving reference to FIG. 1, a description of the environment in which the invention is to be utilized is now presented. The invention is executable upon a combination including a personal computer (PC) 10 and a magnetic disk ("diskette") 12. The personal computer can be from any vendor, for example, it can comprise one selected from any of the PC series available from International Business Machines Corporation, Armonk, New York. The diskette 12 is a flat circular plate with at least one magnetizable surface layer on which data can be stored by magnetic recording. It is understood that PCs of the type contemplated by the invention include hardware embracing a central processing unit (CPU), which is the portion of a personal computer that includes circuits which interpret and execute instructions. A CPU such as the CPU 14 is a programmable entity whose basic operations are controlled by software constituting an operating system. Personal computers such as the PC 10 characteristically operate under the control of a disk operating system (DOS) such as the DOS 16. The DOS 16 conventionally operates in connection with a disk driver (DD) such as the disk driver 18 to manage use of a diskette such as the diskette 12 as a secondary storage device. The DOS 16 provides the instructions necessary to operate the disk driver 18 in reading and writing data on the diskette 12.

As is known, diskettes are widely used to transport application programming into personal computers. In this regard, software forming an application program is written onto a diskette, which is transported to and inserted in the disk driver of a personal computer. The application program on the diskette is transferred in whole or in part from the diskette to the primary memory of the personal computer where it is used to execute an application for the user of the computer. For example, a word processing program on the diskette 12 can be loaded through the disk driver 18 into the primary memory (not shown) of the personal computer 10, where it can support the production and processing of documents created by the user of the PC 10. Another generic application program distributed on diskettes and enjoying wide popularity is the "spreadsheet" program.

The sequences of instructions which make up application (and other) programs are referred to characteristically as "software." In this regard, the term "software" refers to any series of instruction steps carried in code form on a diskette, which is entered into a personal computer for execution thereupon. The term "diskette-distributed software" refers to programs which are made available for the mass market on diskettes for use in personal computers.

The software on the diskette 12 is represented by the program 20. In the program 20, there resides an INSTALL module 21, an INITIALIZE module 22, and the main body of an application program 24. In addition, the program 20 has a COPY PROTECT module 26. When the diskette 12 is first entered into the PC 10 for the initial use of the application 24, the structure of the program 20 requires a user to adapt the program to the particular configuration of the PC 10. In this regard, the INSTALL module 21 is first invoked to enter data into a parameter list (not shown) regarding various structural or functional features of the PC 10. For example, the application 24 may have the capability to echo keystrokes by providing a cursor positioning command. In execution of the INSTALL module 21, the cursor positioning function would be entered into the parameter list, if available on the PC 10. Other parameter list data acquired by the INSTALL module 21 could include, for example, CRT terminal type and I/O port addresses. Additionally, the INSTALL module 21 may acquire a list of service options available in the application 24 and selected by the user. For example, the first-time user of a complex application program may select an error correction dialog to be invoked by the application program whenever the user invokes an incorrect command or function or attempts an improper response to a program prompt. The INSTALL module can be invoked by a user at any time to alter the parameter list should the configuration of the personal computer system be altered. Furthermore, software on a single diskette in the disk driver of a central resource such as a file server or minicomputer can be installed in any one of a plurality of personal computers connected to the central resource.

The INITIALIZE module 22 is called to establish the initial session connectivity between the application program 24 and operating system 16 whenever the diskette 12 is inserted into the driver 18 for execution of the application program 24. The INITIALIZE module 22 may include interaction with the user, but certainly involves interaction with the operating system 16 for the purpose of transferring the application program 24 in whole or in part into the primary memory of the PC 10 and setting initial constant values. Once the application program 24 is installed and initialized, it can be executed on the PC 10. The COPY PROTECT module 26 is invoked automatically in response to detection of conditions assumed to indicate unpermitted copying. When invoked, the COPY PROTECT module 26 operates in the mode selected by the distributor of the software to protect the application program 24 from unpermitted copying.

In the practice of the invention, the software 20 further includes a source identification (SID) 28, a check number storage location (CHKSTOR) 30, and an encryption module (ENCRYPT) 32. In this regard, the SID 28 is a unique code associated with and identifying the source of the diskette-distributed software 20. The SID is either selected by or assigned to a software vendor who wishes to protect his software from illegal use or copying. The SID 28 is written onto the diskette 12 in an addressable location known to the ENCRYPT routine. CHKSTOR 30 is a storage area whose location is known to both the INSTALL and ENCRYPT modules, and which is either blank or initialized with a vendor-installed code interpreted by the INSTALL module 21 to mean that CHKSTOR 30 is empty. The ENCRYPT module 32 is a process, callable by the INSTALL and INITIALIZE modules 21 and 22 and embodying any known encryption process which can perform encryption of the SID and a CPUID described below.

Also necessary to the practice of the invention is the provision of a CPU identification (CPUID) 36 in the personal computer 10. The CPUID 36 is a special word stored in the read only memory (ROM) of the personal computer 10. In the preferred embodiment, the word consists of 64 bits which serve to uniquely identify the personal computer 10. The word has the format shown in FIG. 6. The first 16 bits of the CPUID form a validity flag appropriate for indicating whether the CPUID meets predetermined validity conditions established by the manufacturer. In order to avoid the need for standardization, the remaining 48 bits of the CPUID 36 are chosen at random; thus, the probability of two personal computers having the same CPUID is vanishingly small. It is further asserted that the CPUID is located in a standard location whose address is the same from one personal computer to the next. Last, the address of the CPUID 36 is known to the ENCRYPT module 32. It is contemplated that the CPUID would be generated, placed in ROM, and installed in the PC 10 by the manufacturer of the PC.

Figure 2:
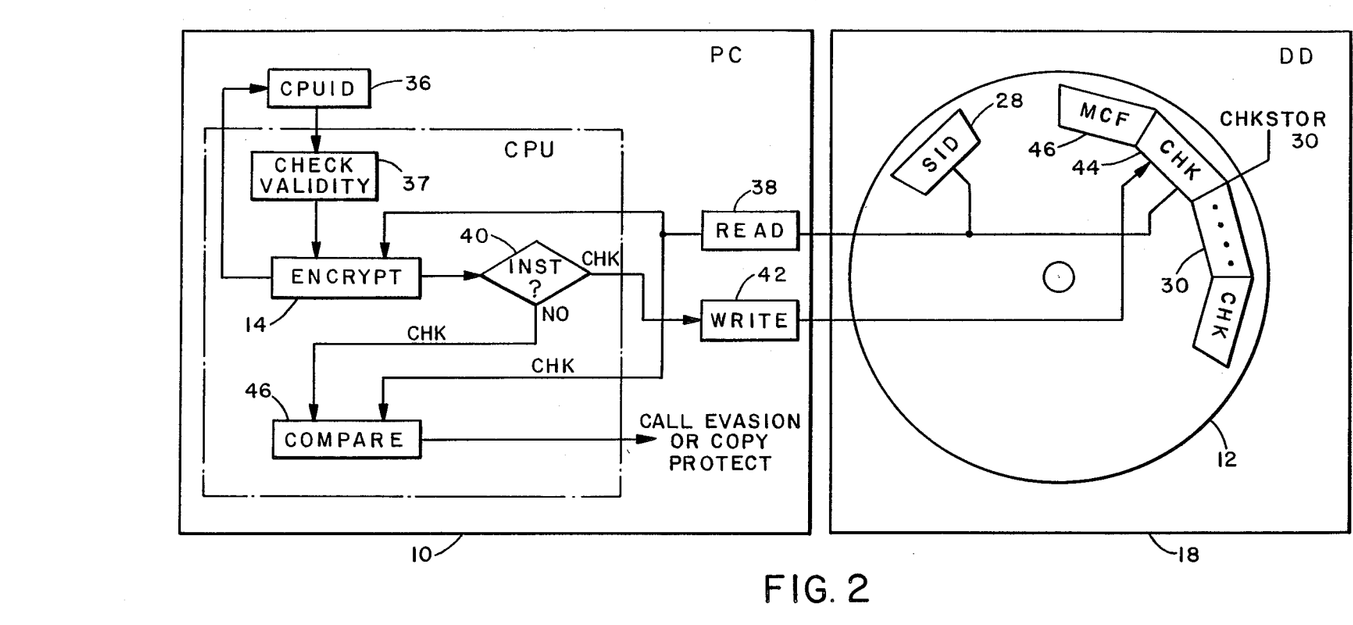
FIG. 2 illustrates in greater detail the interconnection of a personal computer with a disk driver in which is inserted a disk configured for practicing the invention.

As specified, the ENCRYPT module 32 is a process automatically called by the INSTALL and INITIALIZE modules during their executions. FIG. 2 symbolically illustrates the ENCRYPT module 32 being performed by the CPU 14. When executed, the ENCRYPT module obtains the CPUID 36 from its addressable location in the PC 10 and obtains the SID 28 from its addressable location on the diskette 12. When obtaining the CPUID, the ENCRYPT module employs a conventional validity checking modality to ascertain whether the CPUID meets the pre-established validity requirements. In the discussion following, it is presumed that the CPUID is valid; if not, the evasion and/or protection features described below can be implemented. The SID 28 is obtained by a standard READ function in the PC 10. The CPUID 36 and SID 28 are subjected to the encryption algorithm embodied in the ENCRYPT module 32 to produce a check number, or code (CHK). If the ENCRYPT module 32 is called by the INSTALL module 21, the positive exit is taken from the decision 40 and the WRITE function 42 is called to write CHK into the first available spot in the CHKSTOR sector 30 of the disk 12. In FIG. 2, a check number is entered in location 44 of CHKSTOR 30. Alternatively, if the ENCRYPT module 32 is called by the INITIALIZE routine 22, the READ function 38 is invoked to obtain CHK from location 44 on the disk 12 whence it is provided to a COMPARE function 46 embedded in the ENCRYPT module 32. In addition, the check number generated by the ENCRYPT module 32, instead of being written to CHKSTOR on the diskette 12, is also provided to the COMPARE function 46. The COMPARE function 46 is a conventional procedure used to determine whether the check number generated by the ENCRYPT module 32 is identical with CHK 44. If the output of the ENCRYPT function 32 does not compare with the check number 44, the output of the COMPARE function 46 indicates such a disparity and is used to invoke the COPY PROTECT module 26 or an EVASION step built into the INSTALL and INITIALIZE modules.

Figure 4:
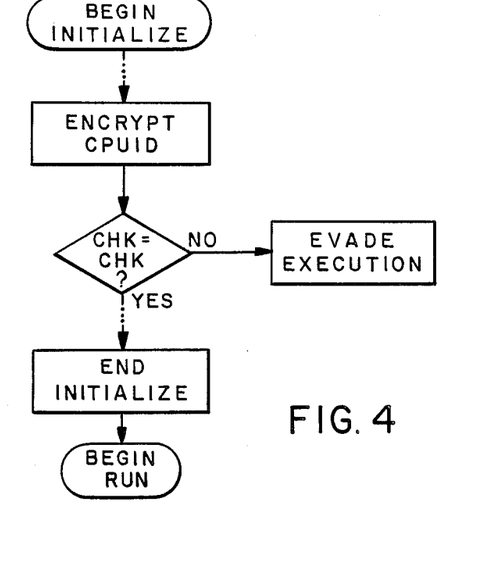
FIG. 4 is a flow diagram illustrating the method of the invention practiced during a legal execution of software installed according to FIG. 3.
Figure 5:
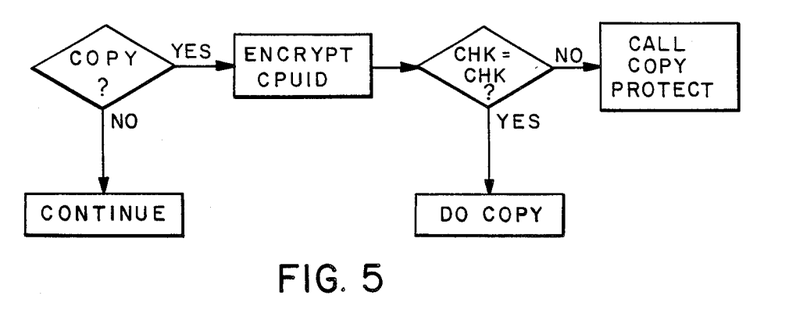
FIG. 5 is a flow diagram fragment illustrating the method of the invention during copying of the diskette of FIGS. 1 and 2.

Referring now to FIGS. 3-5 and Tables I-III, the operation of the invention and its method embodiment will be explained. The method is executable during the three major phases of software operation listed in Table I. Thus, the method is invoked by the INSTALL module 21 when the diskette 12 is loaded into the PC 10 for establishing or changing global operating parameters of the PC. The method is also operated whenever the diskette 12 is inserted into the disk driver 18 for execution of the APPLICATION module 24 or whenever the diskette 12 is inserted into the disk driver 18 for the purpose of copying the software 20 to another diskette through invocation of the COPY command of the PC 10.

TABLE I
```
INSTALL
EXECUTE APPLICATION
COPY
```

TABLE II
```
INSTALL PROCEDURE
DO INSTALL
DO ENCRYPT
  IF CHKSTOR NOT INITIALIZED,
  THEN, WRITE CHK TO CHKSTOR
  GO TO CONTINUE INSTALL
  ELSE
  IF MCF AND CHKSTOR IS NOT FULL,
  THEN,
    IF CHK EQUALS A CHK IN CHKSTOR
    GO TO CONTINUE INSTALL
    ELSE
    WRITE CHK IN CHKSTOR
    GO TO CONTINUE INSTALL
    END
  ELSE,
  IF CHKSTOR IS FULL
  THEN,
  EVADE EXECUTION
  ELSE,
  IF CHK DOES NOT EQUAL CHK
  IN CHKSTOR
  THEN
  EVADE EXECUTION
  ELSE
  GO TO CONTINUE INSTALL
  END
CONTINUE INSTALL
END
```

TABLE III
```
EXECUTE APPLICATION
DO INITIALIZE
  DO ENCRYPT
    IF CHK DOES NOT EQUAL CHK,
    THEN, EVADE EXECUTING
    ELSE CONTINUE INITIALIZE
  END
  CALL APPLICATION
END
```

As shown in FIG. 3 and Table II, when the software 20 is initially installed in the PC 10, the INSTALL module is called to establish the parameters in configuration of the PC 10 that are determinative of the mode of execution of the APPLICATION 24. During the performance of the INSTALL process, the ENCRYPT module 32 is called, the CPUID 36 and SID 28 are obtained and encrypted, and a CHKNO is generated. If nothing has been written to CHKSTOR, the generated CHKNO is written to CHKSTOR and the INSTALL process is continued. Otherwise, if the CHKSTOR is not full and if a multicheck flag (MCF) 46 is set, it is assumed that the vendor contemplates the sale of the right to use the software at a site where a plurality of CPU's will access it. In this case, with CHKSTOR initialized and MCF set, the generated CHK is compared against the CHK's already in CHKSTOR. If a match is found, the installation process is continued, the assumption being that the authorized CPU is altering its installation parameters. Otherwise, the nonmatched CHKNO is written to CHKSTOR. If, however, CHKSTOR is full, it is assumed that the number of CPU's contemplated to be covered by the license have qualified, in which case an exit EVADE EXECUTION is taken.

On the other hand, if the diskette 12 is intended only for use with a single CPU, the generated CHKNO is compared against the CHKNO and CHKSTOR. If the numbers do not match, then the EVADE EXECUTION exit is taken. Otherwise, if the numbers match, installation is continued, the assumption being that the software is being reinstalled in the authorized CPU.

The EVADE EXECUTION can be any of a number of commands, jumps, or routines that will thwart execution of the APPLICATION 24. In its simplest form, the evasive action can include simply jumping to the end of the APPLICATION 24. Alternatively, the installation process can be altered by a routine which destroys or alters data while being processed by the I/O procedures in the APPLICATION 24, so that the user will obtain gibberish.

Once the software 20 has been installed on the PC 10, it is assumed that the software 20 will not invoke the INSTALL procedure unless prompted by the user. After installation, each time the diskette 12 is inserted into the driver 18 for execution of the APPLICATION process 24, the INITIALIZE procedure 22 is automatically invoked in order to establish connectivity between the software 20 and the DOS 16 necessary for execution. In the INITIALIZE procedure, the routine illustrated in FIG. 4 and Table III is encountered. First, the CPUID 36 and SID 28 are subjected to the encryption modality of ENCRYPT 32 to generate a check number. Then, CHKSTOR 30 is scanned to determine whether the check number generated by the ENCRYPT process 32 matches a check number in CHKSTOR 30. If not, the EVADE EXECUTION exit is called, otherwise, INITIALIZE is completed and the application 24 is executed.

As shown in FIG. 5, whenever the diskette 12 is subjected to a COPY commadd by a personal computer, the ENCRYPT process 32 is called to generate a check number from the CPUID of the copying personal computer and the SID on the disk. If the generated CHKNO does not match one in CHKSTOR 30, COPY PROTECT 26 is invoked, otherwise, COPY is executed, which results in copying of the software 20, including CHKSTOR 30. Thus, the software protection scheme of the invention will reside in the software copied onto another diskette. Alternatively, the inventor contemplates that a COPY command can be executed without encryption in comparison of check numbers, since the protection scheme of the invention would still be embedded in the copied software. Thus, if the software copy was intended to be run on a personal computer having a CPUID different from the CPUID 36, either the INSTALL process or the INITIALIZE process would still be effective in protecting the software 20 by preventing its use on an unauthorized PC, that is, one whose CPUID does not match the CPUID 36. In this case, of course, execution will never proceed further than INSTALL or INITIALIZE.

As disclosed thus far, the invention as operated according to Tables II and III and FIGS. 3-5 is useful for automatically authorizing use or replication of the diskette-borne software 20 on an authorized computing system, such as the PC 10 identified by the CPUID 36. In the case where a software vendor would lease software on a site lease basis with a predetermined number of unidentified CPUs authorized to use the software, the capacity of CHKSTOR 30 to store more than one check number permits the diskette 12 to be installed in, for example, a file server (not shown in FIG. 1) that connects to a plurality of CPUs. In this case, each time a CPU with a CPUID is installed in the computing system including a file server with the diskette 12 in it, an INSTALL routine similar to that of FIG. 3 would be employed to not only make entries into the program parameter list for the installed CPU, but also to generate the check number for the CPU being installed and enter the check number into CHKSTOR 30. Thereafter, whenever the APPLICATION 24 is executed by a CPU connected to the file server, the comparison step of the ENCRYPT routine would scan all of CHKSTOR 30 until either a match was found, or the end of CHKSTOR reached with no match of CHK numbers.

It is further contemplated that copies of the site-licensed software made by authorized CPUs would be executable only on the copying CPU. In this regard, provision would be made in the CHK=CHK step of FIG. 5 for confirming that the CPUID of the copying CPU is indeed in CHKSTOR 30 by scanning CHKSTOR. Assuming validating the DO COPY module would include process means for invalidating all of the slots in CHKSTOR, save the one containing the CPUID of the copying CPU. This would prevent the copy from being initialized for an unauthorized CPU.

Figure 7:
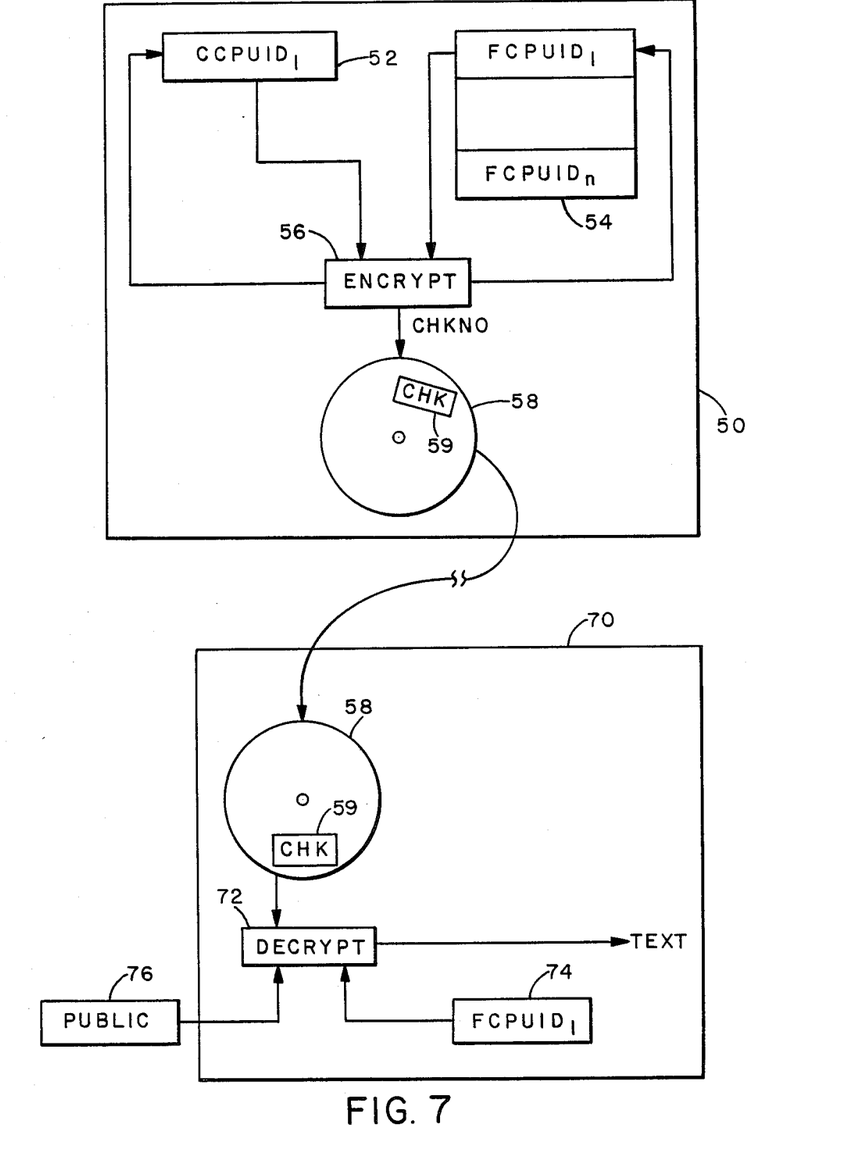
FIG. 7 illustrates an alternative embodiment of the invention.

FIG. 7 illustrates an adaptation of the invention to an embodiment useful in, for example, a battlefield situation wherein battlefield orders are issued from a secure command post to a plurality of battlefield tactical positions, each including a computing apparatus with a uniquely-identified CPU. Each tactical CPU is referred to as a field CPU and has a unique, secure field CPUID (FCPUID). The central command post has a CPU for issuing orders in encrypted program form carried on a diskette. The command post CPU is referred to as the CCPU and has a secure identification (CCPUID). Thus, in FIG. 7, the command post computer 50 has embedded in it the secure CCPUID 52 and stores a secure list of field CPUIDs 54. A public-key encryption modality 56 encrypts the CCPUID with a selected FCPUID to generate a check number CHKNO which is placed on a diskette 58 at position 59. In addition, orders in encrypted form are written to the diskette 58 using the public-key process, and the diskette is then carried to a tactical field post having a field CPU 70.

The diskette 58 is plugged into the field CPU 70, where a routine similar to the INITIALIZE routine of FIG. 4 is performed. In this routine, installation of the diskette 58 in the CPU 70 invokes a public-key decryption process 72 which is the inverse of the encryption process 56. The decryption process 72 can be included in the software on the diskette 58. The FCPUID 74 of the field CPU 70 and a public-key 76, which is known to the operator of the CPU 70, are fed to the decryption process which operates conventionally to decrypt the orders in encrypted form on the diskette 58. If the FCPUID of the CPU 70 matches the FCPUID used to encrypt the orders on the diskette 58, the decryption process will produce a clear text of the command post orders. Otherwise, either no action is taken to decrypt the software, or protective action to destroy or alter the software is undertaken. In this manner, orders can be transmitted using a relatively simple and straightforward scheme to protect the orders by a first level of encryption in which a known password or key and a secret password (the FCPUID) are provided to unlock access to the orders only in the event that the recipient of the physical embodiment of the orders (the diskette) can generate a key or password identical with the one on the diskette.

It should be evident that the embodiments of the invention do not prevent illegal use on copying by a knowledgeable, determined person. However, they have the advantage of providing an inexpensive, easily implemented means of making unauthorized use or copying very difficult, yet which makes authorized use or copying easy.

Obviously, many modifications and adaptations to the described invention are possible in light of these teachings. However, it must be understood that those skilled in the art can make such changes without departing from the spirit and the scope of the invention as defined in the appended claims.

I claim:

1. A method of controlling the use and replication of diskette software contents on unauthorized diskette-driven computing systems, said method comprising the steps of:
    placing a first ID code in a preselected computing system;
    identifying a source of programming software for said computing system with a second ID code;
    placing said second ID code on a diskette bearing a program obtained from said source, said program including a execution protection feature;
    deriving a first check number through encryption of one of said ID codes with the other of said ID codes;
    placing said first check number on said diskette; and
    upon access of said diskette by any computing system, deriving a second check number through encryption of said second ID code on said diskette with an ID code in said accessing computing system, comparing said second with said first check number, and bypassing the protection feature in the event of a match.

2. The method of claim 1 wherein said second ID code and said first check number are placed in said diskette when said program is installed in said computing system.

3. The method of claim 1 wherein said access is for the purpose of execution of said program.

4. The method of claim 1 wherein said access includes copying of said program to a second diskette.

5. The method of claim 1 wherein said step of placing said check number includes writing said check number to a predetermined storage area on said diskette, said predetermined storage area including storage space for a plurality of check numbers, and said step of comparing includes comparing said second check number with a check number in said storage area.

6. A system for authorizing use or replication of diskette software contents on identified computing systems, comprising:

a diskette containing a software program;

a source identification (SID) code on said diskette associated with and identifying the source of said software;

a check store number on said diskette, said check store number representing the encryption of said SID code;

a computing system for receiving said diskette and including at least one CPU having an embedded CPU identification (CPUID) code associated with and identifying said CPU; and program means in said software program, said program means being executable on said CPU for generating a check number through encryption of one of said ID codes with the other of said ID codes and for preventing the execution of said software on a CPU other than said one CPU if said check number is not identical with said check store number.

7. The system of claim 6 further including:

check storage means on said diskette for receiving said check store number and a plurality of check numbers, each of said check numbers generated by said program means in response to said SID and to a CPUID from a respective one of a plurality of authorized CPUs operating in said computing system; and means in said programming means for preventing execution of said software by an unauthorized CPU if the check number generated by said program means does not match a check number stored in said check storage means.

8. The system of claim 6, wherein said program means is further for preventing copying of said software if said check number is not identical with said check store number.

9. A system for authorizing use of diskette software contents on authorized computing systems, comprising:

a diskette;

a first computing system for entering software on said diskette, said first computing system including a first ID code identifying said first computing system, and a list of ID codes identifying CPUs authorized to execute said software;

an encryption procedure in said software for generating a first check number based upon an ID code from said list, said first check number being written onto said diskette with said software by said first computing system;

a second computing system with a CPU for receiving said diskette and executing said software, said second computing system including a second ID code identifying its CPU;

encryption means in said first and second computing systems for generating a first check number based upon public-key encryption of said first ID code and a second ID drawn from said list, said first check number being written onto said diskette with said software, and for generating a second check number based upon said public-key encryption of said second ID code; and means in said first and second computing systems for comparing said first and second check numbers and preventing execution of said software by said second computing system based upon mismatch of said check numbers.

* * * * *